United States Patent
Fröjdh et al.

(10) Patent No.: US 8,635,359 B2
(45) Date of Patent: Jan. 21, 2014

(54) FILE FORMAT FOR SYNCHRONIZED MEDIA

(75) Inventors: Per Fröjdh, Stockholm (SE); Clinton Priddle, Indooroopilly (AU); Zhuangfei Wu, Solna (SE)

(73) Assignee: Telefonaktiebolaget L M Ericsson (Publ), Stockholm ( * ) Notice: Subject to any disclaimer, the term of this patent is extended or adjusted under 35 U.S.C. 154(b) by 86 days.

(21) Appl. No.: 13/508,059

(22) PCT Filed: Nov. 5, 2010

(86) PCT No.: PCT/SE2010/051209
§ 371 (c)(1),
(2), (4) Date: May 4, 2012

(87) PCT Pub. No.: WO2011/056139
PCT Pub. Date: May 12, 2011

(65) Prior Publication Data
US 2012/0221741 A1 Aug. 30, 2012

Related U.S. Application Data

(60) Provisional application No. 61/258,654, filed on Nov. 6, 2009.

(51) Int. Cl.
*G06F 15/16* (2006.01)
(52) U.S. Cl.
USPC ........................................... 709/231
(58) Field of Classification Search
USPC ........................................... 709/231
See application file for complete search history.

(56) References Cited

U.S. PATENT DOCUMENTS

| | | | |
|---|---|---|---|
| 2004/0006575 A1* | 1/2004 | Visharam et al. | 707/104.1 |
| 2004/0146285 A1 | 7/2004 | Matsui et al. | |
| 2009/0055417 A1* | 2/2009 | Hannuksela | 707/100 |
| 2009/0319563 A1* | 12/2009 | Schnell | 707/103 R |
| 2011/0096828 A1* | 4/2011 | Chen et al. | 375/240.02 |
| 2011/0231569 A1* | 9/2011 | Luby et al. | 709/234 |
| 2012/0013746 A1* | 1/2012 | Chen et al. | 348/180 |

(Continued)

FOREIGN PATENT DOCUMENTS

WO   2009/003683 A1   1/2009

OTHER PUBLICATIONS

3rd Generation Partnership Project. 3GPP TS 26.244, V8.2.0 (Sep. 2009). 3rd Generation Partnership Project; Technical Specification Group Services and System Aspects Transparent end-to-end packet switched streaming service (PSS); 3GPP file format (3GP) (Release 8). Sep. 2009.

(Continued)

*Primary Examiner* — Larry Donaghue
(74) *Attorney, Agent, or Firm* — Murphy, Bilak & Homiller, PLLC

(57) ABSTRACT

Metadata defining decoding and rendering instructions for media content to be co-rendered in a media presentation is divided and distributed as track fragments (15, 16) provided in different media container files (11). Track fragment adjustment information (20) is included in at least one such track fragment (15) in order to define rendering timing relationships between media content portions defined by the track fragments (15, 16) in a current media container file (11). The rendering timing relationships enable a correct time alignment of the playback of the media content to be co-rendered to achieve a synchronized media presentation. The track fragment adjustment information (20) is particularly advantageous in connection with tuning in or a random access in a stream of media container files (1, 11) comprising fragmented metadata.

19 Claims, 8 Drawing Sheets

(56) References Cited

U.S. PATENT DOCUMENTS

2012/0185570 A1* 7/2012 Bouazizi et al. .............. 709/219
2013/0007223 A1* 1/2013 Luby et al. ................... 709/219

OTHER PUBLICATIONS

Singer, D. et al. "Intermedia Format (MP4) VM text." International Organisation for Standardisation, Coding of Moving Pictures and Audio, ISO/IEC JTC1/SC29/WG11, MPEG98/N2612p4; Dec. 1998.

3rd Generation Partnership Project. "Static HTTP Streaming." 3GPP TSG-SA4 MBS Ad-hoc, S4-AHI071, Seattle, Washington, USA, Sep. 28-Oct. 1, 2009.

3rd Generation Partnership Project. "Movie Fragments in HTTP Streaming." 3GPPSA4-MBS SWG on MBS_Ext, Tdoc S4-AHI117, Issy Les Moulineaux, France, Dec. 14-16, 2009.

* cited by examiner

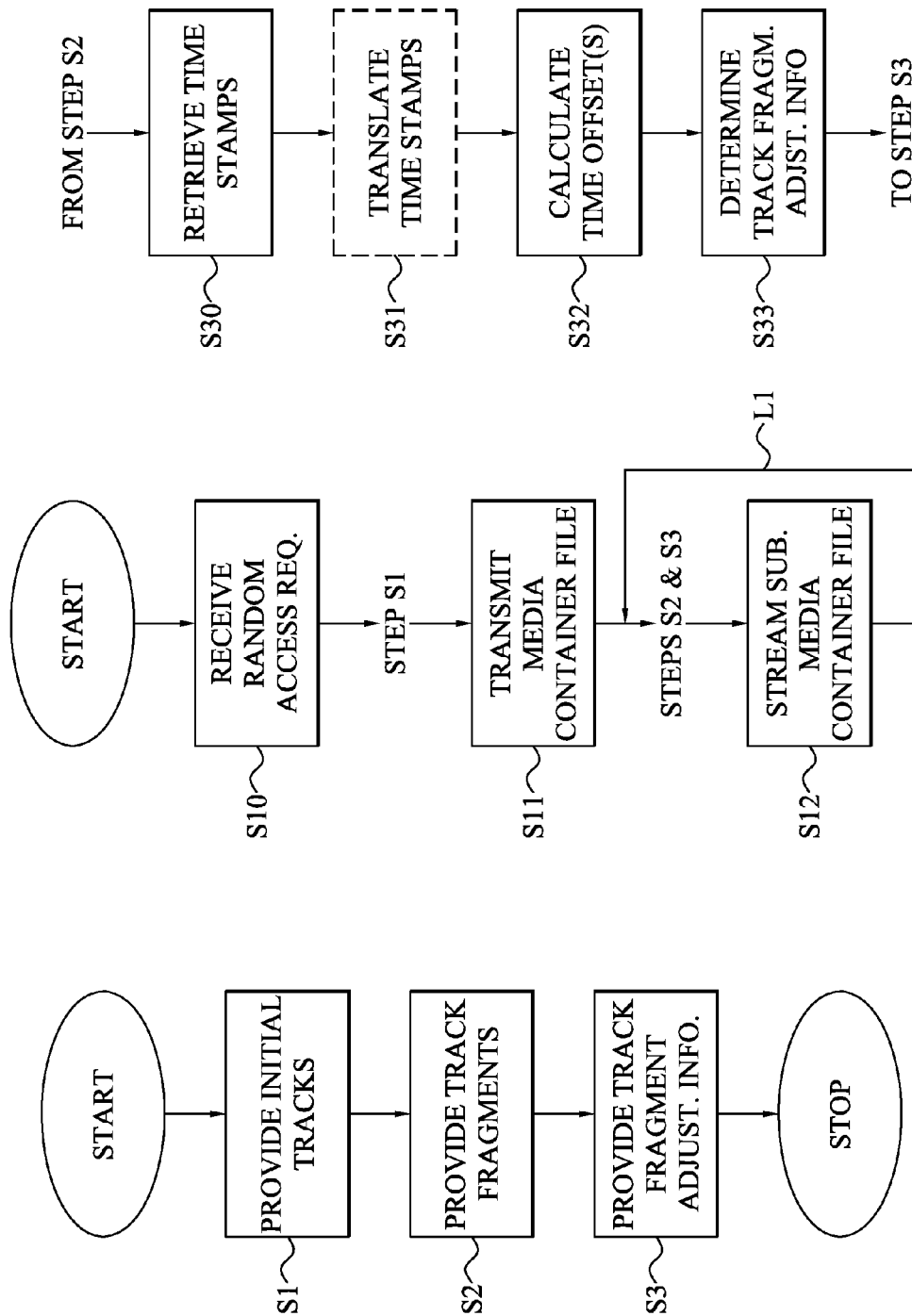

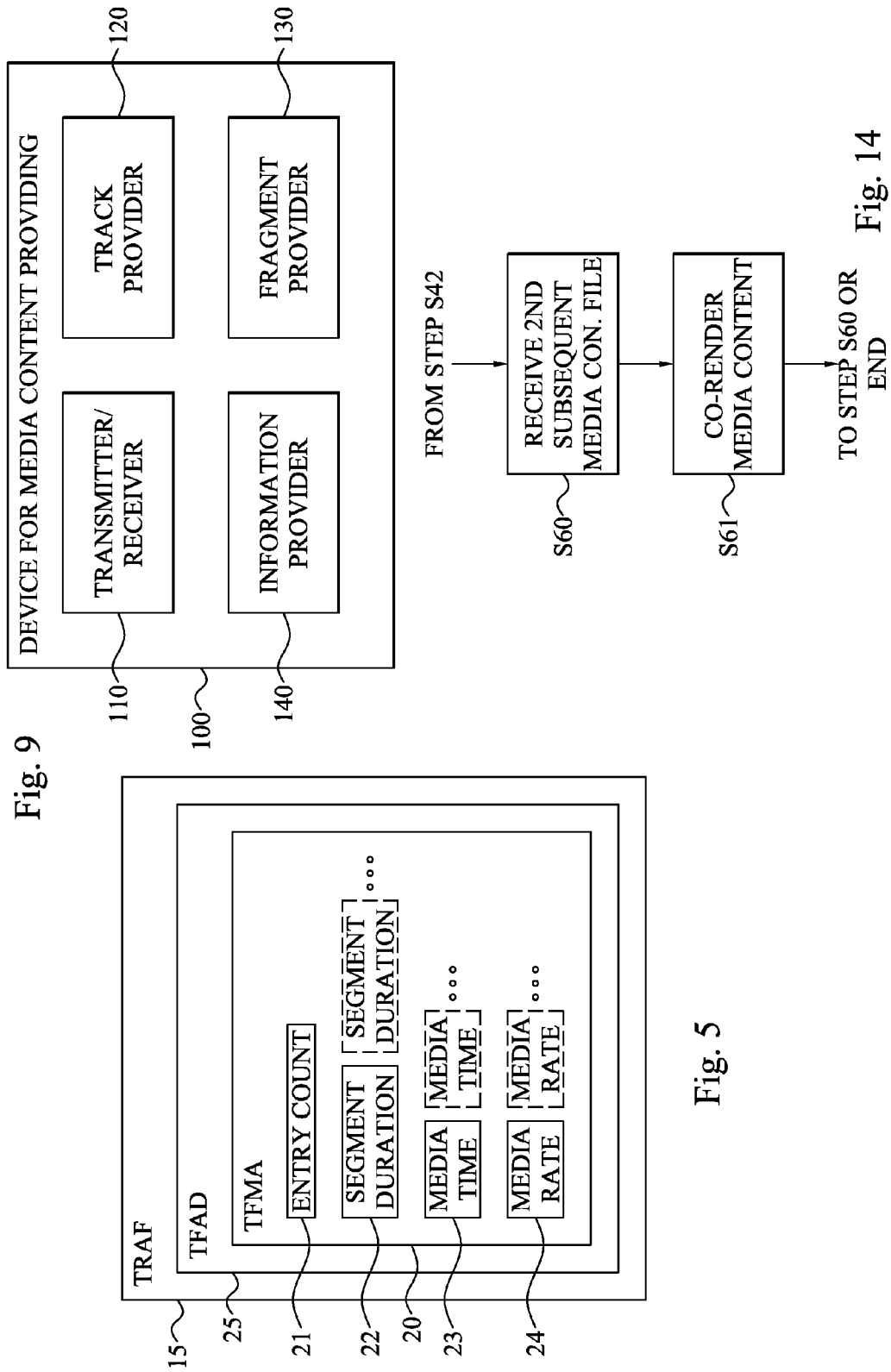

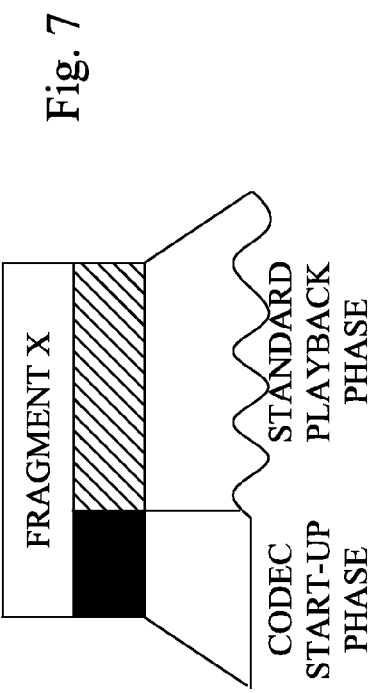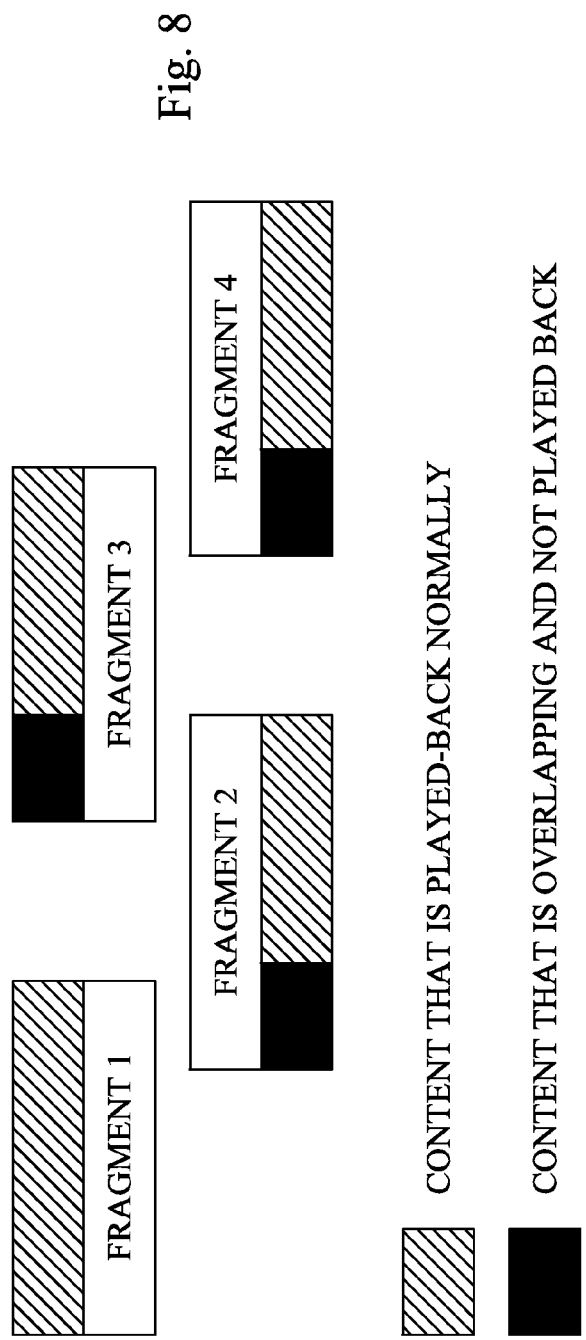

FILE FORMAT FOR SYNCHRONIZED MEDIA

TECHNICAL FIELD

The present invention generally relates to media content, and in particular to enabling synchronized media rendering in a user terminal.

BACKGROUND

The Motion Picture Experts Group (MPEG) has standardized the ISO base media file format which specifies a general file format that serves as a base to a number of more specific file formats, such as the 3GP file format. The file structure is object-oriented and a file is formed by a series of objects called boxes. The structure of a box is inferred by its type. Some boxes only contain other boxes, whereas most boxes contain data. All data of a file is contained in boxes.

A file can be divided into an initial track, contained in a movie box of type 'moov', and a number of incremental track fragments, contained in movie fragment boxes of type 'moof'. Each track fragment extends the multimedia presentation in time. The movie box and the movie fragment boxes are metadata boxes containing the information needed by a user terminal or client to decode and render the media presentation. The actual media data is stored in mediadata boxes of type 'mdat'.

Track fragments make it possible to distribute the metadata into multiple chunks and thereby avoid the situation where the complete file structure has to be known by the client at the start of playback or rendering. As long as metadata is delivered as a sequence of track fragments, these track fragments can be created live during the transmission, and/or chosen between different versions with different bitrates.

Seeking in ISO/3GP files depends on the structure. When track fragments are used, seeking positions is very difficult since the client can only move one track fragment ahead at a time. The reason for this that the client needs to know the length of a track fragment to find the start of the next track fragment.

Furthermore, when a media track is split up into fragments, it is unlikely that the track fragments will be perfectly aligned. This is at least partly due to different sampling frequencies. For example, video may be sampled at a rate of 30 frames per second, i.e. 33 ms between frames, and audio may be grouped into units each 20 ms long. Even in this simple example, it is obvious that the track fragments will be rarely aligned.

This becomes problematic in random access, when playback of a clip does not start at the beginning, e.g. after a seek. A track fragment may be requested, but will be played out of synchronization since the client has no way of knowing about the differences in track fragment lengths due to the lack of knowledge of the previous track fragment lengths.

A trivial solution to this problem could be to give track fragments an explicit time stamp. Then the timing relationship between track fragments would be well known. But this would remove an important property from track fragments—the fact that they do not have explicit time stamps makes the insertion of commercials, splicing of programs, etc. very simple. In fact, the addition of explicit time stamps to track fragments would put constraints on how track fragments can be used that are not present today.

There is therefore a need in the art of an efficient solution to enable seeking and random access to a stream of media content which has been fragmented and defined by a sequence of track fragments but still achieving synchronized rendering. In particular, there is a need for such a solution that does not require the use of explicit time stamps to the track fragments.

SUMMARY

It is a general objective to enable a synchronized media presentation involving co-rendering of media contents.

This and other objectives are met by embodiments as disclosed herein.

An aspect of the embodiments relates to a method of providing media content for streaming. The method involves providing an initial track for each media content of at least a first media content and a second media content. The initial tracks are provided in a media container file and define the respective media contents. At least one track fragment is further provided for each media content. The track fragments comprise information defining decoding and rendering instructions applicable to respective media content portions of the relevant media content. At least one track fragment is further complemented with track fragment adjustment information that is applicable to the media content portion defined by the track fragment. The track fragment adjustment information defines rendering timing relationships between the media content portion of the relevant media content and a corresponding media content portion of the at least one other media content to be co-rendered during a media presentation.

The track fragment adjustment information thereby defines the rendering timing relationships between the media content portions defined by the track fragments. The rendering timing relationships enable correct alignment, in terms of rendering time, of the different media content portions to be co-rendered to thereby achieve a synchronized media presentation.

Another aspect of the embodiments defines a device for providing media content for streaming. The device comprises a track provider configured to provide an initial track for each media content of at least a first and a second media content in a media container file. A fragment provider provides at least one track fragment for each media content, where the track fragment defines decoding and rendering instructions applicable to a portion of the relevant media content. An information provider is implemented in the device to provide track fragment adjustment information in at least a track fragment associated with the first media content. The track fragment adjustment information is then applicable to the portion of the first media content defined by the track fragment.

A further aspect of the embodiments involves a method of rendering media content. The method comprises requesting and receiving a media container file comprising an initial track for each media content of at least a first and a second media content. The initial track of the first/second media content defines the first/second media content. A subsequent media container file is also received. The subsequent media container file comprises a track fragment for each media content. The track fragment comprises information defining decoding and rendering instructions for a portion of the media content. The subsequent media container file also comprises track fragment adjustment information contained at least in a track associated with the first media content and is applicable to the portion of the first media content defined by the track fragment. The portion of the first media portion defined by its track fragment in the subsequent media container file and the corresponding portion of the second media portion defined by its track fragment in the subsequent media container file are co-rendered based on the track fragments and based on the track fragment adjustment information. The track fragment adjustment information then defines rendering timing relationships between the portion of the first media content and the corresponding portion of the second media content to achieve a correct rendering alignment in time of the media content portions and a synchronous media presentation.

Yet another aspect of the embodiment defines a user terminal comprising a transmitter configured to transmit a request for a media container file comprising a respective initial track for each media content of at least a first and a second media content. A receiver is provided in the user terminal for receiving the media container file and a subsequent media container file comprising track fragments for the first and second media contents and track fragment adjustment information. A media player is configured to co-render the portions of the first and second media contents defined by the track fragments in the subsequent media container file. The media player conducts the co-rendering based on the track fragments defining the decoding and rendering instructions and based on the track fragment adjustment information defining the rendering timing relationship between the portions of the first and second media content.

BRIEF DESCRIPTION OF THE DRAWINGS

The invention, together with further objects and advantages thereof, may best be understood by making reference to the following description taken together with the accompanying drawings, in which:

FIG. 1 is a flow diagram illustrating a method of providing media content according to an embodiment;

FIG. 2 is a flow diagram illustrating additional steps of the method in FIG. 1;

FIG. 5 is a schematic illustration of the organization of track fragment adjustment information according to an embodiment;

FIG. 6 is a flow diagram illustrating additional steps of the method in FIG. 1;

FIG. 7 schematically illustrates a movie fragment with a codec start-up phase and a standard playback phase;

FIG. 8 illustrates an example of fragments with start-up phases, where each start-up is overlapping with the previous fragment;

FIG. 9 is a schematic block diagram of a device for providing media content according to an embodiment;

FIG. 14 is a flow diagram illustrating additional steps of the method in FIG. 12.

DETAILED DESCRIPTION

Figure 3:
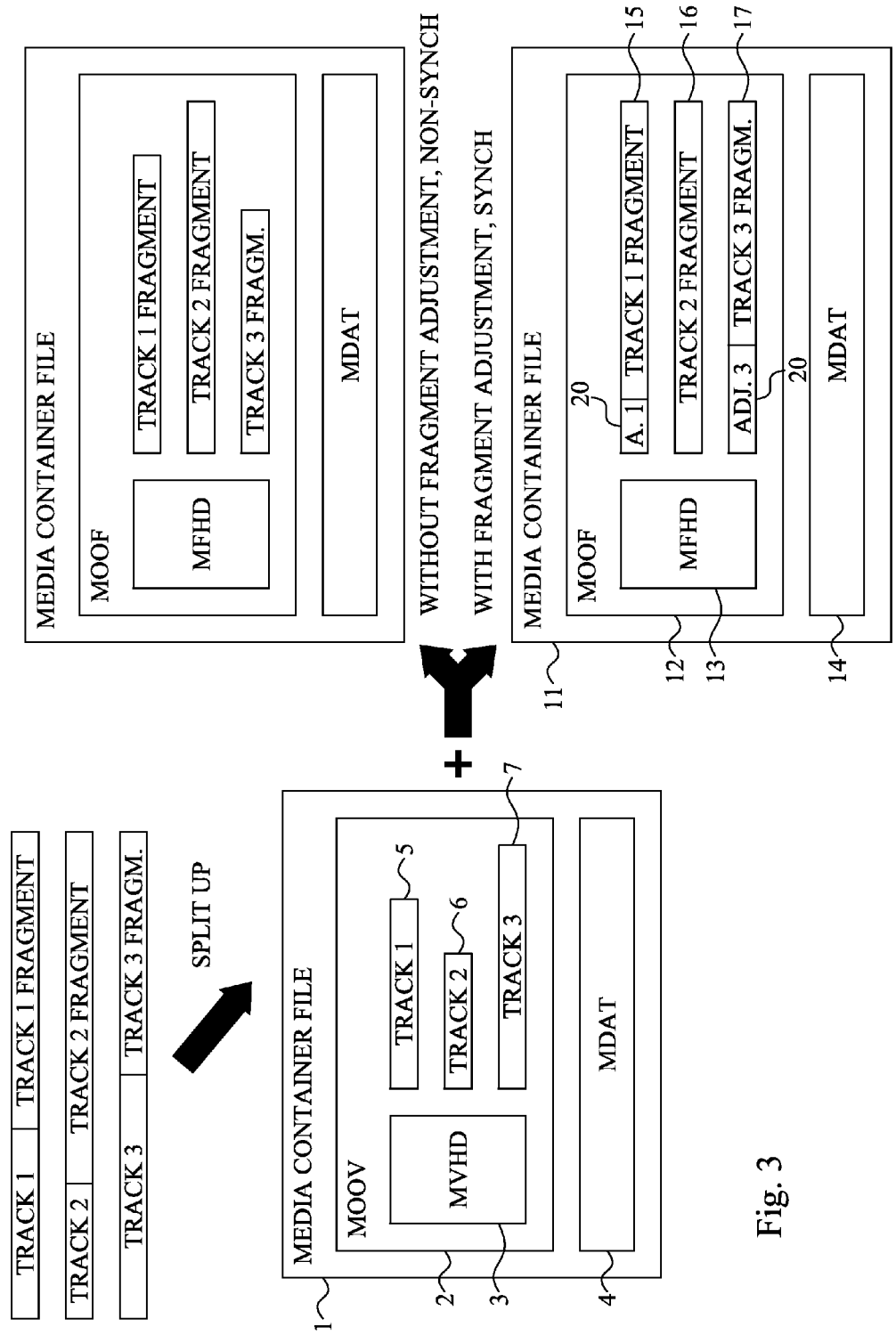
FIG. 3 schematically illustrates advantages of the embodiments over prior art.

Throughout the drawings, the same reference numbers are used for similar or corresponding elements.

The embodiments generally relate to processing of media contents and in particular to techniques enabling synchronized rendering of media content in connection with fragmented media content using track fragments for defining the media content.

The embodiments complement the metadata contained in the track fragments with track fragment adjustment information that is applicable to media content portions and defines rendering timing relationships between media contents that are to be co-rendered during a media presentation. The track fragment adjustment information can therefore be used by a user terminal as synchronization basis enabling a synchronized rendering even during a random access or seek procedure. Thus, the track fragment adjustment information enables the user terminal to access a stream of track fragments at any point and still be able to, based on the track fragment adjustment information, derive the rendering timing relationships even though the previous track fragments in the stream have not been received or processed by the user terminal.

Media content as disclosed herein relates to media data that can be communicated to a user terminal for decoding and rendering therein to provide a media presentation to a user. Media content can therefore be video content or data that is played and presented on a display screen. Alternatively, or in addition, media content can be audio content or data that is played back and can be listened to by a user using a loudspeaker. In a particular embodiment at least first media content and second media content are co-rendered during a media presentation. One of the first media content and the second media content is then advantageously video content, whereas the other of the first media content and the second media content is typically audio content. Alternatively or in addition, a first media content can represent video data of a left view for 3D or stereo video, a second media content could then be the video data for the right view. In addition, a third media content could be audio data that is to be co-rendered with the 3D or stereo video data.

According to the embodiments, the media content is advantageously streamed to the user terminal. The embodiments are in particular suitable to be used in connection with Hypertext Transfer Protocol (HTTP) streaming of media content. The media content could, for instance, be live media content generated or captured in connection with the streaming process. However, also previously generated, i.e. non-live, media content can advantageously be streamed as disclosed herein. A further variant is so-called adaptive content that can be either live or non-live. Streaming of media content also encompasses variants thereof, which provide streaming-like delivery protocols including, for instance, progressive download of 3GP files.

FIG. 1 is a flow diagram illustrating a method of providing media content for streaming. The method starts in step S1 which provides a respective initial track for each media content of at least a first media content and a second media content in a media container file. The media container file can be regarded as a complete input package that preferably comprises, in addition to any media content per se, information and instructions required by the user terminals for performing the decoding and rendering of the media content. The ISO base media file format can advantageously be employed as file format for the media container file, including various storage formats derived or based on the ISO base media file format, such as the Advanced Video Coding (AVC) file format. The AVC file format in turn specifies how H.264 (MPEG-4 AVC) is carried in various file formats derived from the ISO base media file format, e.g. the MP4 and 3GP file format.

The initial track provided in step S1 comprises metadata defining the particular media content to which the initial track is associated. This metadata includes information needed by a user terminal to decode and render the media content associated with the initial track. This means that the metadata includes, among others, identifiers of the relevant media content and information of the codec employed for encoding the media content.

According to the embodiments, the metadata relating to a particular media content is not provided as a single track or file. In clear contrast, the initial track for a media content is complemented with at least one, typically multiple, i.e. at least two, track fragments that complement the metadata provided in the initial track. The next step S2 therefore provides at least one such track fragment for each media content. A track fragment then comprises information and metadata defining decoding and rendering instructions for a media content portion of the relevant media content. Thus, media content is built up of a number of media samples, such as video or audio samples. In such a case, track fragments can be applicable to different media samples of the media content. For instance, the initial track could include general metadata but does not provide any specific decoding or rendering instructions applicable to particular media samples. A first track fragment could then include the metadata applicable to media sample 1 to k, a second track fragment includes the metadata for media sample k+1 to m, a third track fragment includes the metadata for media sample m+1 to n and so on (k<m<n).

There is generally an advantage in fragmenting or dividing the metadata into multiple track fragments as compared to using a single track with all the metadata. Firstly, streaming of live content can only be effectively performed if the metadata is provided in different track fragments that are generated and transmitted as the media content is generated. Otherwise all media content must be first generated before the metadata can be generated and transmitted to the user terminal. The fragmentation of the metadata therefore enables transmission of media content samples and metadata applicable to these media samples as they are generated without the need to await the completion of the generation of all media content. Secondly, transmission of all metadata relating to a media content of a media presentation as a single track or file could amount to transmitting quite a lot of data. It will therefore then be a perceivable delay from requesting a particular media content until the user terminal has received and processed all metadata and can start decoding and rendering the media content.

Hence, the metadata applicable to the media contents is split up into different track fragments according to the embodiments.

The track fragments provided in step S2, or at least a portion thereof, can be included in the same media container file as the initial tracks provided in step S1. However, it is generally preferred to group and organize the track fragments in one or more following media container files to thereby enable transmission of the media container file with the initial tracks independently of the transmission of the track fragments.

A next step S3 of the method in FIG. 1 provides track fragment adjustment information in at least one track fragment associated with at least one of the first and second content. The track fragment adjustment information is applicable to a media content portion of the relevant media content and defines rendering timing relationships between the media content portion and a corresponding media content portion of the other media content to be co-rendered with the media content portion during a media presentation. For instance, track fragment adjustment information can be provided in step S3 in a track fragment associated with the first media content. The track fragment adjustment information then defines rendering timing relationships between a media content portion of the first media content and a corresponding media content portion of the second media content to be co-rendered with the media content portion of the first media content.

A particular embodiment of step S3 provides track fragment adjustment information not only in a first track fragment associated with the first media content but also in a second track fragment associated with the second media content. Then, the track fragment adjustment information in the first track fragment is applicable to a media content portion of the first media content defined by the first track fragment, whereas the track fragment adjustment information in the second track is associated with the corresponding media content portion of the second media content defined by the second track fragment.

The track fragment adjustment information comprises timing information that can be processed in a user terminal to determine a timing relationship between the media content portions of the first and second media contents to be co-rendered during the media presentation. This means that the user terminal can use the timing information in order to correctly time the start of the rendering of the respective media content portions to achieve a synchronous media rendering.

FIG. 3 schematically illustrates the concept of providing initial tracks, track fragments and track fragment information. In the upper left portion of FIG. 3 three parallel tracks of metadata applicable to different media contents that can be co-rendered during a media presentation. For instance, the first track could relate to video content coded at one particular bit rate, the second track relates to audio content and the third track is also video content but encoded at another bit rate. Alternatively, the first track could be video content of a left view, the second track could be video content of a right view for stereo or 3D video and the third track relates to audio content.

According to the embodiments, the metadata of the different tracks is split up in respective initial tracks 5, 6, 7 provided in a first media container file 1 and following track fragments 15, 16, 17. The initial tracks 5, 6, 7 are preferably organized in a movie ('moov') container or box 2, which is a container for the metadata relating to the media content. The movie container 2 typically also comprises a movie header ('mvhd') container or box 3 defining overall information which is media independent, and relevant to the entire media presentation considered as a whole. The figure also illustrates the media data ('mdat') container or box 4 that is the container for the actual media data for the media presentation. Generally, the moov box 2 sets the basic structure of a media presentation by preferably storing the most important information, such as numbers of tracks, sample descriptions, track identifiers that are important to make the media content data understandable and possible to manipulate. Besides that, it may contain few or no samples in its track 5, 6, 7.

The track formation is done to be able to startup fast and to tune in at certain point of time. To this concise or empty movie box 2, samples are added consecutively in the following movie fragments which are connected to the movie box 2 by movie extends box ('mvex') (not illustrated). In this way, the user terminal can perform fast startup by just downloading the small size moov box 2 and request for further metadata and media content data referenced by track fragment on the way.

The upper right part of FIG. 3 illustrates a subsequent media container file comprising the track fragments but without any fragment adjustment, i.e. according to prior art techniques. In such a case, all track fragments will be interpreted by a user terminal as having the same starting time even though the length of the initial tracks 5, 6, 7 preceding the track fragments did not have the same length in time. In the illustrated example, the initial track 6 for the second media content has much shorter duration than the initial tracks 5, 7 for the first and third track content. This means that the track fragment of the second media content should actually be started in advance of the track fragments of the first and third track fragments. However, in order for the user terminal to be aware of this difference in starting time of the track fragments the user terminal must access the stream at the stream start and then process the initial tracks 5, 6, 7 and each following track fragment up to the current set of track fragments. If the user terminal instead conducts a random access or seek into the stream it will not have this prior information of the respective durations of the previous track fragments. The user terminal will therefore assume that the track fragments in the current media container file should have the same start time as indicated in the upper, right part of FIG. 3. The result will be non-synchronous media rendering, where, for instance, the audio playback will be out of phase with the corresponding video rendering.

The lower, right part of FIG. 3 illustrates an embodiment where track fragment adjustment information 20 is provided in at least some of the track fragments 15, 17. The track fragment adjustment information 20 provides instructions and information to the user terminal to determine that the different track fragments 15, 16, 17 should have different starting times. This means that the track fragment 16 for the second media content should start in advance of the track fragments 15, 17 of the first and third media content in the illustrated example.

The track fragments 15, 16, 17 and the track fragment adjustment information 20 are preferably included in a subsequent media container file 11. In similarity to the first media container file 1, the subsequent media container file preferably comprises a movie fragment ('moof') container or box 12, which is a container for the metadata relating to the subsequent media content portions. The movie fragment container 12 typically also comprises a movie fragment header ('mfhd') container or box 13. The movie fragment header box 13 typically contains a sequence number, as a safety check. The sequence number usually starts at 1 and increases for each track fragment in the files 1, 11, in the order in which they occur. This allows readers to verify integrity of the sequence of media container files 1, 11. The figure also illustrates the media data container 14, which can be included in the subsequent media container file 11.

The track fragment adjustment information 20 of the embodiments enables synchronized rendering of the media content by a user terminal by providing the necessary information and instructions to identify the timing relationships between the track fragments 15, 16, 17.

Metadata in the form of track fragment adjustment information 20 is thus added to the track fragments 15, 16, 17 describing timing operations. This can be done, as is further discussed herein, in the form of a new box that gives the relationship between the media time of samples in a track fragment 15, 16, 17 and a hypothetical timeline. This metadata may be redundant if a clip is decoded from the beginning or a previous moof box 12 in sequence is decoded. The creator of the media container file 11 provides this information as a substitute to the timing information that would have been gained by decoding the file stream from the beginning. The user terminal may then use this information to calculate the timing relationship between tracks on a seek.

The figure illustrates a particular case when not all track fragments 15, 16, 17 need to be assigned and comprise track fragment adjustment information 20. In another embodiment, each track fragment 15, 16, 17 in the subsequent media container file 11 comprises respective track adjustment information 20.

The track fragment adjustment information of the embodiments can be provided in all track fragments of the first and second media content in step S3 of FIG. 1. This means that if the media content is provided as a stream of media container files track fragment adjustment information can be entered in the track fragments of all the subsequent media container files. A user terminal that accesses the stream from the beginning, starting with the media container file with the initial tracks, and continuing to receive all subsequent media container files do not need the track fragment adjustment information. In clear contrast, the user terminal can determine the timing relationships between track fragments based on the respective durations of the previously received track fragments. In such a case, the user terminal can simply disregard the track fragment adjustment information.

However, a user terminal that accesses the stream at some point after the stream start, such as in connection with a seek operation, will not, according to the prior art, know the relative start times for the track fragments. The reason for this is that the user terminal has no prior knowledge of the respective durations of past track fragments in the stream. In such a case, the user terminal can use the track fragment adjustment information provided in the subsequent media container file in order to achieve synchronization between rendering the media contents defined by the respective track fragments. The track fragment adjustment information in any following subsequent media container files can be disregarded by the user terminal since it then knows the time relationships between track fragments based on the respective durations of the track fragments in the previous media container file.

In an alternative embodiment, the track fragment adjustment information is provided in response to a request originating from a user terminal. FIG. 2 schematically illustrates this concept. The method starts in step S10 where a random access request is received. The random access request informs that a user terminal intends to access the media stream at an intermediate point, i.e. not receiving and rendering from the start of the media stream. The method then continues to step S1 of FIG. 1, where the media container file with initial tracks is provided. This media container file is transmitted in step S11 to the requesting user terminal. Though, the media content can be streamed to the user terminal, this initial media container file can be sent off-stream, such as downloaded to the particular user terminal. The media container file then comprises the initial metadata required by the user terminal in order to initiate decoding set-up and be ready for receiving, decoding and rendering media content. The method continues to steps S2 and S3 of FIG. 1, where track fragments and track fragment adjustment information are provided. The following step S12 introduces the track fragments and track fragment adjustment information in a subsequent media container file that is streamed to the user terminal. As new media content is to be defined, new track fragments and optionally new track fragment adjustment information are preferably provided and included in subsequent media container files that are streamed to the user terminal, which is schematically illustrated by the line L1. In a particular embodiment, each subsequent media container file comprises one track fragment per media content and per initial track in the first media container file.

It is also possible to omit adding any track fragment adjustment information in the subsequent media container files except the first subsequent media container file streamed to a user terminal. The user terminal has generally no need for the track fragment adjustment in formation in the further subsequent media container files since it can correctly time align the track fragment in these files based on the length of the track fragments in the previously received subsequent media container file(s).

The streaming of the subsequent media container file to the user terminal is, in a particular embodiment, conducted using HTTP. It is expected that HTTP will be used as the main protocol for multimedia delivery. Today packet switched streaming service already supports this to some extend by using the 3GP file format. An advantage of HTTP as streaming protocol instead of the traditional streaming protocol, Real-time Transport Protocol (RTP), is that most proxies and firewalls support HTTP, whereas not all proxies and firewalls can correctly handle RTP.

The separate transmission of the first media container file in step S11 and streaming of subsequent media container files with track fragments and track fragment adjustment information in step S12 can be performed also in embodiments where no random access requests are received or triggers the provision the provision of the track fragment adjustment information.

The stream of media container files could then be in the form of the initial media.3gp file comprising the initial tracks and the moov box. This initial media container file is then followed by the subsequent media container files comprising the track fragments and the moof box: media_001.3gs, media_002.3gs, media_003.3gs and so on.

Figure 4:
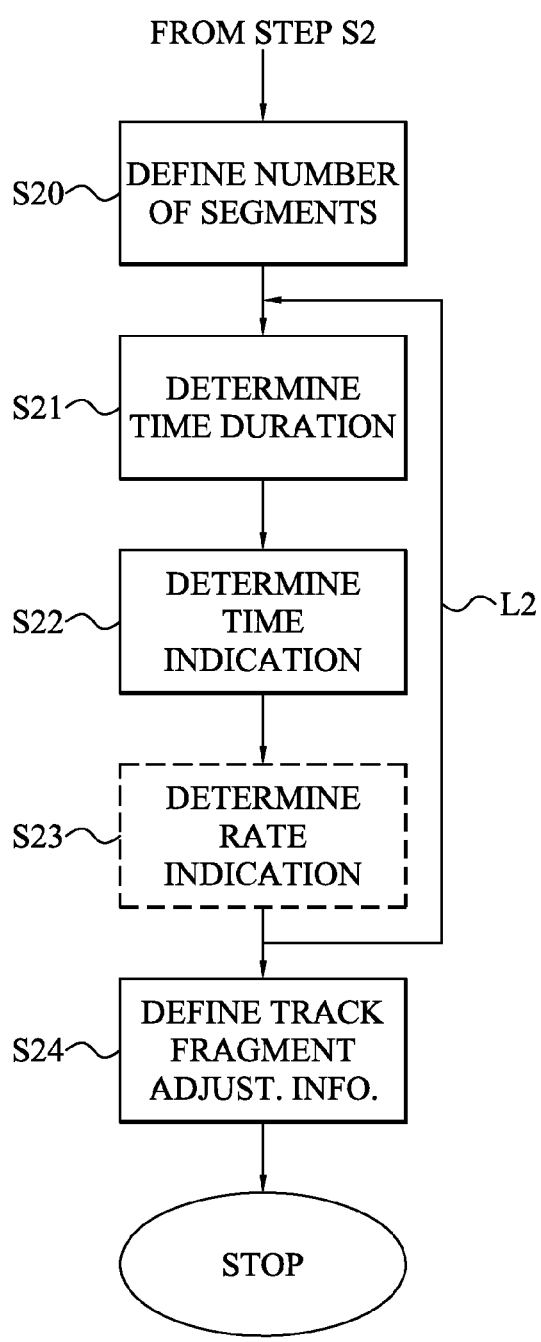
FIG. 4 is a flow diagram illustrating an embodiment of the information providing step in FIG. 1.

FIG. 4 is a flow diagram illustrating an embodiment of providing the track fragment adjustment information. The method continues from step S2 of FIG. 1. A next step S20 defines a number of adjustment segments in the media content portion for which the track fragment adjustment information applies. The media content presentation during which the media content portion is to be rendered is therefore divided into one or more adjustment segments for which time adjustments can be defined.

The following steps S21 to S23 of FIG. 4 are then preferably conducted for each adjustment segment defined in step S20 for a particular track fragment, which is schematically illustrated by the line L2. Step S21 determines a time duration of the adjustment segment. The time duration preferably defines the duration or length of the particular adjustment segment in units of a time scale associated with the media presentation, such as provided in the movie header box (see FIG. 3) or elsewhere in the media container file.

A next step S22 determines a time indication for the adjustment segment. The time indication represents a starting time of the adjustment segment within the media content portion of the relevant media content. Alternatively, the time indication represents an empty time indicating that no rendering of the media content should occur during the duration of the adjustment segment.

A next optional step S23 determines a rate indication for the adjustment segment. The rate indication represents a relative rendering rate for the media content corresponding to the adjustment segment.

The loop of steps S21-S23 can be conducted serially for the different adjustment segments or in parallel.

The next step S24 defines the track fragment adjustment information for the particular track fragment to comprise the number of adjustment segments defined in step S20, the time duration for each adjustment segment from step S21, the time indication for each adjustment segment from step S22 and optionally the rate indication for each adjustment segment from step S23.

With reference to FIG. 5, in a particular embodiment, a track fragment is defined as a track fragment box or container ('traf') 15. The track fragment box 15 preferably comprises a track fragment header box or container ('tfhd') (not illustrated) and optionally one or more track fragment run boxes or containers ('trun') (not illustrated). The track fragment box 15 is a container for a track fragment adjustment box ('tfad') 25. The track fragment adjustment box 25 can be defined, in line with the ISO base media file format, as:

Box Type: 'tfad'
Container: Track fragment box ('traf')
Mandatory: No
Quantity: Zero or one The track fragment adjustment box 25, if present, is advantageously positioned after the track fragment header box and before the first track fragment run box. The track fragment adjustment box 25 is then a container for the track fragment adjustment information 20.

```
aligned(8) class TrackFragmentAdjustment box extends Box ('tfad') {
}
```

In a particular embodiment the track fragment adjustment box 25 is a container for the track fragment media adjustment box or container ('tfma') 20 that provide the track fragment adjustment information, such as in the form of explicit time line offsets:

```
Box Type:    'tfma'
Container:   Track fragment adjustment box ('trad')
Mandatory:   No
Quantity:    Zero or one
aligned(8) class TrackFragmentMediaAdjustmentBox extends
FullBox('tfma', version, 0) {
    unsigned int(32) entry_count;
    for (i=1; i <= entry_count; i++) {
        if (version==1) {
            unsigned int(64) segment_duration;
            int(64) media_time;
        } else { // version==0
            unsigned int(32) segment_duration;
            int(32) media_time;
        }
        int(16) media_rate_integer;
        int(16) media_rate_fraction = 0;
    }
}
```

The parameter Version is an integer that specifies the version of the track fragment media adjustment box 20, typically 0 or 1. In a particular embodiment, version 1 has 64 bits per element field, while version 0 has 32 bits per element field. The parameter entry count 21 is an integer that gives the number of entries in the track fragment media adjustment box 20 and corresponds to the number defined in S20 of FIG. 4. The parameter segment duration 22 is an integer that specifies the duration of the adjustment segment, preferably in units of the time scale in the movie header box. Segment duration 22 was determined in step S21 of FIG. 4. The parameter media time 23 is an integer containing the starting time within the media of the current adjustment segment, preferably in media time scale units, in composition time. If this field is set to a predefined value, preferably −1, it is an empty edit. The last adjustment in a track should preferably never be an empty edit. Any difference between the duration in the movie header box and the duration of the track is preferably expressed as an implicit empty edit at the end. Media time 23 was determined in step S22 of FIG. 4. The parameter media rate 24 specifies the relative rate at which to play the media corresponding to this adjustment segment. If this value is equal to a predefined value, preferably 0, then the adjustment is specifying a dwell. This means that the media at media time 23 is presented for the segment duration 22. Otherwise this field is set to another predefined value, preferably 1. The media rate 24 was determined in step S23 of FIG. 4.

The syntax of the track fragment adjustment information is compatible with edit lists of the ISO base media file format. This way it is straightforward to transform fragment adjustments to edit lists in case the media of the track fragments are not simple continuations of media in previous track fragments, but when the track fragments are sent after insertion of other fragments, such as commercials, slicing, etc., or as a tune-in point after a seek operation.

In an alternative embodiment explicit signaling is included, either in the track fragments themselves or elsewhere in the media container file, in order to indicate whether track fragments adjustments are mandatory to interpret or when they may be ignored conditionally.

Track fragment adjustment information is generally ignored when they are signaled to be ignored and under the condition of normal playback, i.e. consecutive playback of track fragments without seeking, tune-in, etc. This way it is possible to distinguish between the cases when the fragment media is a simple continuation in a sequence of consecutive fragments or whether it needs media adjustments due to compositions, slicing, commercial insertion, tune-in etc.

In order to illustrate how the preferred parameters of the track fragment adjustment information can be used in a real implementation example assume a situation with HTTP streaming of video and audio data. In such a case, the moov box (see FIG. 3) comprises a video track and an audio track and each moof box (see FIG. 3) in the subsequent media container files comprises a video traf and an audio traf.

Assume further that the video traf defines 60 s of video that should be played as:
1) wait 10 s before starting video rendering;
2) start the video and play it for 40 s;
3) pause the video renderings for 20 s (make a dwell)—for instance to insert commercials; and
4) play the rest 20 s of the video.

The track fragment adjustment information for the video traf could then be defined as:
Entry count=4
$1^{st}$ Adjustment Segment
Segment duration=10 s
Media time=−1
Media rate=1
Media time 23 has here the predefined value of −1 representing an empty edit and indicating that no rendering of the video should occur during the 10 s duration of the first adjustment segment.
$2^{nd}$ Adjustment Segment
Segment duration=40 s
Media time=0 s
Media rate=1
Media time 23 is set to zero to indicate that the video rendering should be started from the start of the video samples defined by the current video traf.

$3^{rd}$ Adjustment Segment
Segment duration=20 s
Media time=40 s
Media rate=0
Media rate 24 is here equal to zero to define a dwell indicating a pause in rendering the video for 20 s.
$4^{th}$ Adjustment Segment
Segment duration=20 s
Media time=40 s
Media rate=1
Media rate 24 has now switched back to 1 to indicate that rendering of the video should be continued. Furthermore, media time 23 indicates that the video rendering should be started at the position at which the rendering in the second adjustment segment ended.

The track fragment adjustment information therefore provides rendering timing relationships that enables synchronized rendering between different media contents to be co-rendered. The track fragment adjustment information can, for instance, define a delay in rendering of the media content portion for a specified period of time by setting media time=−1 and segment duration equal to the specified period of time. It could also be possible to define an advance in rendering of the media content portion by using another predefined value of the media time. Insertions of commercials and splicing of programs is possible by providing track fragment adjustment information that defines a pause in rendering the media content, i.e. setting media rate=0.

FIG. 6 is a flow diagram illustrating additional, optional steps of the method in FIG. 1. The method continues from step S2 in FIG. 1. A next step S30 retrieves a time stamp of the first media sample in the media content portion of the first media content and the time stamp of the first media sample in the corresponding media content portion of the second media content.

A next step S32 calculates a time offset based on the time stamps retrieved in step S30 and this time offset is employed in step S33 to determine the track adjustment information.

In a particular embodiment, step S32 involves finding the minimum value or the maximum value of the time stamps retrieved in step S30. A respective time offset is then calculated between the time stamps retrieved in step S30 and the minimum or maximum value. The calculated offsets are used in step S33 to set the track fragment adjustment information.

In an embodiment, the method also involves translating, in step S31, the time stamps (T1, T2, T3, ...) retrieved in step S30 to a common time scale, such as the time scale in the movie header box, to get translated time stamps (T1', T2', T3', ...). The reason for this time stamp translation could be that the time scales of the retrieved time stamps are very unlikely the same due to different sampling rates for the media contents, such as 30 frames per second for video and 50 frames per second for audio.

Step S32 then involves finding the minimum value of the translated time stamps $T_{MIN}=\text{MIN}(T1', T2', T3', \ldots)$ or the maximum value of the translated time stamps $T_{MAX}=\text{MAX}(T1', T2', T3', \ldots)$. The offsets are then calculated as:

$$\text{Offset1} = T1' - T_{MIN} \text{ or Offset1} = T_{MAX} - T1'$$

$$\text{Offset2} = T2' - T_{MIN} \text{ or Offset2} = T_{MAX} - T2'$$

$$\ldots$$

In this approach different track fragments with different startup times can be perfectly aligned. In addition, the self integrity of the track fragments within the traf box is preserved since all the adjustments can be defined relative to the track fragment that has the minimum or maximum value of time stamp within the traf box.

Generally, video will not be synchronized with audio in most case and the misalignment could be even larger if capture devices and encoding constraints are considered. For instance, audio data could be fragmented at a time point where the corresponding video sample is a B picture that can not be randomly accessed. In such a case, the video track fragment has no choice but to go for the nearest backward or forward I picture. This may result in some obviously longer or shorter tracks.

In such scenario, even these tracks can be aligned with the help of track fragment adjustment information, preferably included in a track fragment media adjustment box. It could still be annoying at the beginning where not all tracks have content, for instance, a 3D movie fragment with only left view in the beginning. It would be desirable that those missing content in the short tracks are amended by the data in the previous track fragment or the extra content in the long tracks are pruned. This in principle can be done given the time offset information provided by track fragment media adjustment box, i.e. by the track fragment adjustment information. The amended complete track fragment helps improve user experience in fragment tune in and is also useful in many other scenarios since it now becomes a complete presentation e.g. transcoding of a media fragment into a standalone movie.

The track fragment adjustment information can also be employed for handling overlapping track fragments, typically movie fragments. This scenario is illustrated in FIGS. 7 and 8. In such a case, the track fragment adjustment information is preferably always used by the user terminals and not only during seek or tune-in operations. The reason for having overlapping fragments can be that some encoders may have a certain start up time before the quality reaches the desirable level, see FIG. 7. In this embodiment, the start up time of a fragment is overlapped with the previous fragment, see FIG. 8. The track fragment adjustment information can then be used to indicate the start-up phase and inform the encoder of where the standard playback phase is started.

FIG. 9 is a schematic block diagram of a device 100 for providing media content for streaming. The device 100 comprises a track provider 120 configured provide a respective initial track for each media content of at least a first media content and a second media content. The initial tracks define the respective media contents and are provided in a media container file by the track provider 120. A fragment provider 130 is implemented in the device 100 and is configured to provide at least one respective track fragment for each of the at least two media contents. These track fragments define decoding and rendering instructions for different portions of the first media content or the second media content. In a particular embodiment, the fragment provider 130 provides at least one, preferably one, such track fragment of the first media content and at least one, preferably one track fragment of the second media content per subsequent media container file.

The device 100 also comprises an information provider 140 configured to provide track fragment adjustment information in at least a track fragment associated with the first media content. The track fragment adjustment information is then applicable to the media content portion of the first media content defined by the track fragment. In a particular embodiment, a first track fragment adjustment information is provided in a first track fragment defining decoding and rendering instructions for a first media content portion of the first media content. A second track fragment adjustment information is likewise provided by the information provider 140 in a second track fragment defining decoding and rendering instructions for a second media content portion of the second media content. In such a case, the first and second track fragments and therefore the first and second track fragment adjustment information are advantageously provided in a same subsequent media container file.

The track fragment adjustment information defines rendering timing relationships between the first media content portion of the first media content and the second media content portion of the second media content. The first and second media content portions are further intended to be co-rendered during a media presentation.

The device 100 for providing media content preferably also comprises a transmitter 110 or general output unit for transmitting the media container file to a requesting user terminal. The transmitter 110 is preferably configured to stream the subsequent media container files to the user terminal and more preferably stream the subsequent media container files using HTTP as streaming protocol.

The information provider 140 of the device 100 could be configured to provide the track fragment adjustment information in all track fragments. In an alternative embodiment, the information provider 140 provides the track adjustment information in at least one track fragment, preferably all track fragments of a subsequent media container file, which will be the first subsequent media container file that a user terminal tuning in to the stream will receive. In such a case, the device 100 preferably comprises a receiver 110 or general input, such as implemented as a transceiver or common input and output unit, for receiving a random access request from the user terminal. The information provider 140 then provides the track fragment adjustment information in the track fragment(s) in response to the received random access request.

The units 110 to 140 of the device 100 may be implemented or provided as hardware or a combination of hardware and software. In the case of a software-based implementation, a computer program product implementing the device 100 or a part thereof comprises software or a computer program run on a general purpose or specially adapted computer, processor or microprocessor. The software includes computer program code elements or software code portions illustrated in FIG. 9. The program may be stored in whole or part, on or in one or more suitable non-transitory computer readable media or data storage means such as magnetic disks, CD-ROMs, DVD disks, USB memories, hard discs, magneto-optical memory, in RAM or volatile memory, in ROM or flash memory, as firmware, or on a data server.

The device 100 can advantageously be implemented in or connected to a media server present in or connected to a network node or base station of a radio-based communication network.

Figure 10:
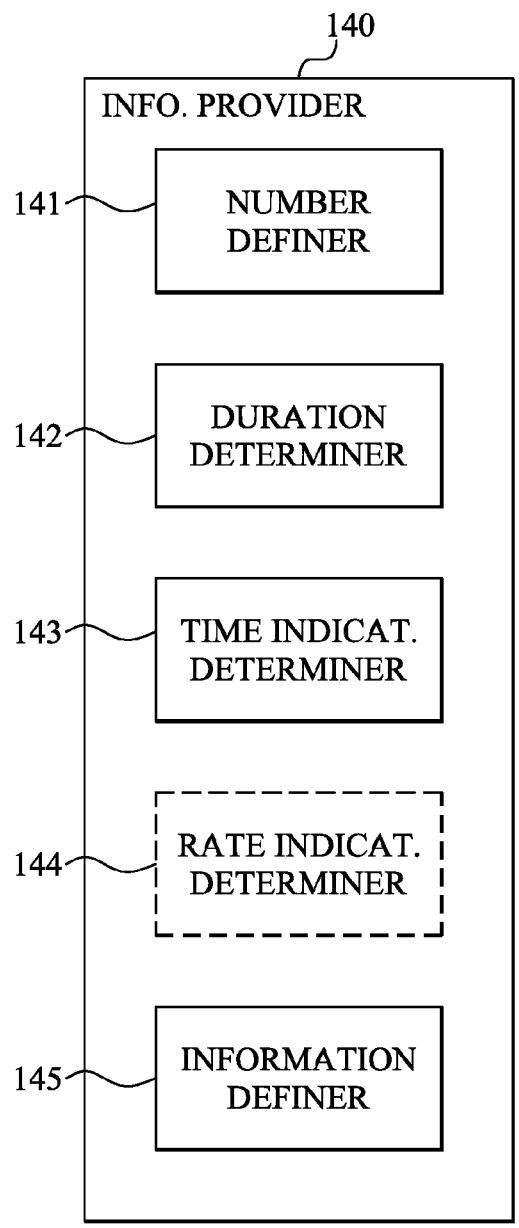
FIG. 10 is a schematic block diagram of an embodiment of the information provider in FIG. 9.

FIG. 10 is a schematic illustration of an embodiment of the information provider 140 in the device of FIG. 9. The information provider 140 comprises a number definer 141 configured to define a number of adjustment segments for the relevant media content portion defined by a track fragment in which the track fragment adjustment information will be entered. A duration determiner 141 is implemented to determine a respective time duration for each adjustment segment. The information provider 140 also comprises a time indication determiner 143 configured to determine a respective time indication for each adjustment segment. The time indication represents a starting time of the adjustment segment within the relevant media content portion or represents a so-called empty time. In the latter case, the empty time indicates that no rendering of the media content should occur during the duration of the adjustment segment. An information definer 145 generates the track fragment information to comprise the number of adjustment segments defined by the number definer 141, the time durations determined by the duration determiner 142 and the time indications determined by the time indication determiner 143.

In an optional embodiment the information provider 140 also comprises a rate indication determiner 144. The rate indication determiner is configured to determine a respective rate indication for each adjustment segment. The rate indication represents a relative rendering rate for the media content portion corresponding to the adjustment segment. For instance, the rate indication could indicate a pause in the rendering or define that rendering should proceed normally. The information definer 145 is in this embodiment configured to generate the track fragment adjustment information to comprise the rate indications determined by the rate indication determiner 144 in addition to the number of adjustment segments, the time durations and the time indications.

The units 141 to 145 of the information provider 140 may be implemented or provided as hardware or a combination of hardware and software. In the case of a software-based implementation, a computer program product implementing the information provider 140 or a part thereof comprises software or a computer program run on a general purpose or specially adapted computer, processor or microprocessor. The software includes computer program code elements or software code portions illustrated in FIG. 10. The program may be stored in whole or part, on or in one or more suitable non-transitory computer readable media or data storage means such as magnetic disks, CD-ROMs, DVD disks, USB memories, hard discs, magneto-optical memory, in RAM or volatile memory, in ROM or flash memory, as firmware, or on a data server.

Figure 11:
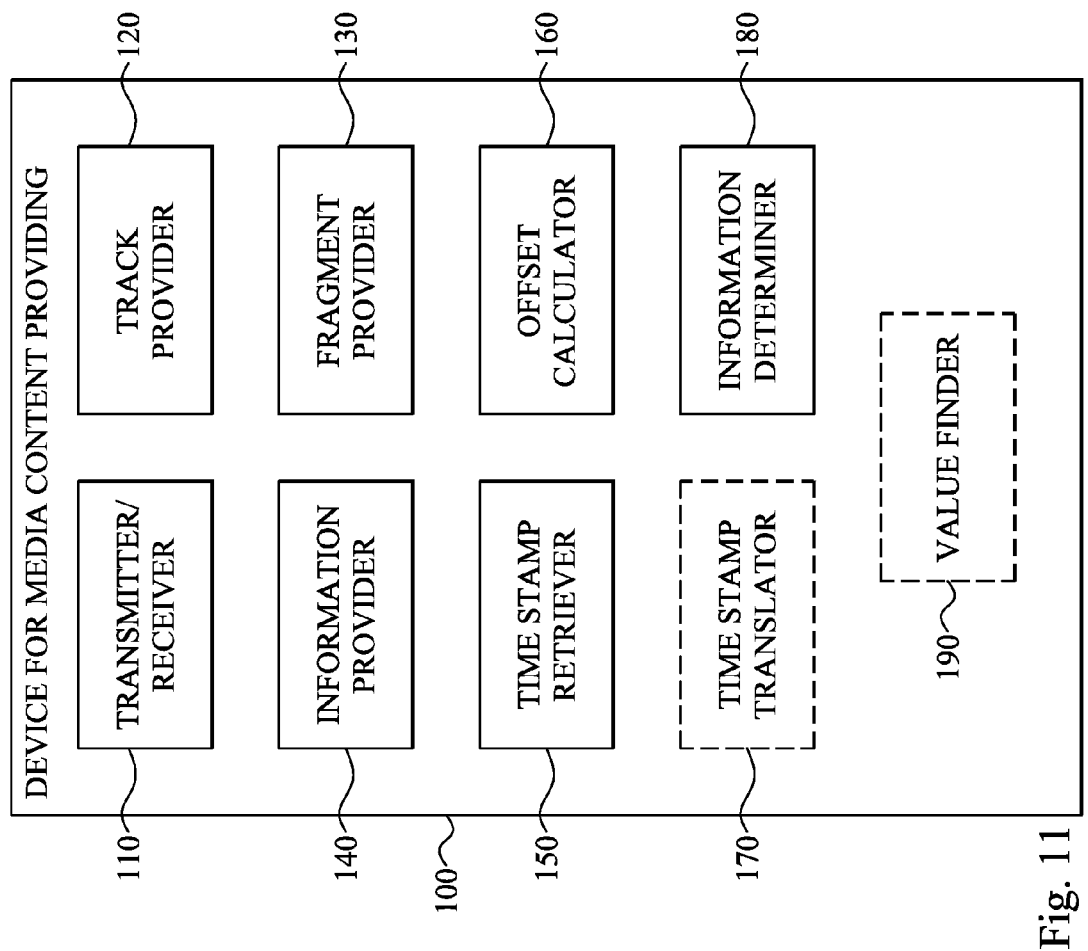
FIG. 11 is a schematic block diagram of a device for providing media content according to another embodiment.

FIG. 11 is a schematic block diagram of another embodiment of the device 100 for providing media content for streaming. In addition to the units previously described above in connection with FIG. 9, this embodiment of the device 100 comprises a time stamp retriever 150 configured to retrieve a time stamp of the first media sample in the first media content portion of the first media content and the first media sample in the second media content portion of the second media content. An offset calculator 160 is implemented to calculate a time offset based on the retrieved time stamps. The device 100 then comprises an information determiner 180 configured to determine the track fragment adjustment information based on the time offset calculated by the offset calculator 160.

In a particular embodiment, the time stamp retriever 150 is configured to retrieve respective time stamps of the first media samples for each media content present in a subsequent media container file. An optional value finder 190 is configured to identify the minimum or maximum value of the retrieved time stamps. The offset calculator 160 calculates a respective time offset for each media content as the difference between the minimum or maximum value from the value finder 190 and the time stamp retrieved by the time stamp retriever 150 for the media content. The information determiner 180 then determines the track fragment adjustment information based on the calculated time offsets.

In a particular embodiment, an optional time stamp translator 170 first translates the time stamps retrieved by the time stamp retriever 150 to a common time scale to form corresponding translated time stamps. The calculation of the time offsets by the offset calculator 160 can then be conducted based on the translated time stamps. In an embodiment, the value finder 190 then finds the minimum or maximum value of the translated time stamps and the offset calculator 160 calculates the time offsets between the minimum or maximum value and the respective translated time offsets.

The units 110 to 190 of the device 100 may be implemented or provided as hardware or a combination of hardware and software. In the case of a software-based implementation, a computer program product implementing the device 100 or a part thereof comprises software or a computer program run on a general purpose or specially adapted computer, processor or microprocessor. The software includes computer program code elements or software code portions illustrated in FIG. 11. The program may be stored in whole or part, on or in one or more suitable non-transitory computer readable media or data storage means such as magnetic disks, CD-ROMs, DVD disks, USB memories, hard discs, magneto-optical memory, in RAM or volatile memory, in ROM or flash memory, as firmware, or on a data server.

The device 100 can advantageously be implemented in or connected to a media server present in or connected to a network node or base station of a radio-based communication network.

Figure 12:
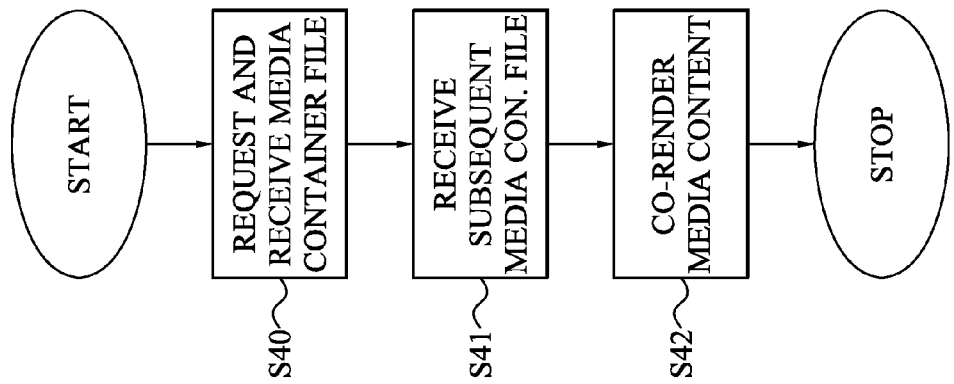
FIG. 12 is a flow diagram illustrating a method of rendering media content according to an embodiment.

FIG. 12 is a flow diagram illustrating a method of rendering media content based on the track fragment adjustment information. The method starts in step S40 where a media container file is requested and received. This media container file is generally a first or initial media container file and comprises the initial tracks defining at least the first and second media content to be co-rendered in a media presentation. The request can advantageously be a random access request for media content streamed over HTTP. A next step S41 receives a subsequent media container file. This subsequent media container file is preferably an intermediate media container file in a stream of multiple media container files. Thus, the reception of the subsequent media container file S41 is typically due to a tune in or seek operation in the file stream. The subsequent media container file comprises a track fragment for each media content, i.e. at least the first and second media content. The track fragment for a particular media content comprises information defining decoding and rendering instructions applicable to a portion of the particular media content. In addition, the track fragment also comprises the track fragment adjustment information according to the embodiments. In a particular embodiment, only one of the track fragments in the subsequent media container file, such as the track fragment associated with the first media content, comprises track fragment adjustment information. Another embodiment provides track fragment adjustment information in multiple, typically all track fragments in the subsequent media container file.

The next step S42 co-renders the respective portions of the first and second media contents defined by the track fragments in the subsequent media container file. This co-rendering in step S42 is performed based on the track fragments and based on the track fragment adjustment information that defines the rendering timing relationships between the respective media content portions. The track fragment adjustment information thereby enables a correct time alignment of the respective media content portions to achieve a synchronized co-rendering, where for instance audio data will be synchronously rendered with video data or left and right view video data will be synchronized and correctly time aligned to achieve 3D or stereo video preferably together with synchronized audio playback.

In the continuing media session, further subsequent media container files are typically received, which is schematically illustrated in FIG. 14. The method continues from step S42 of FIG. 12. A next step S60 receives a second subsequent media container file. If it comprises track fragment adjustment information that information can be ignored and still achieving synchronized co-rendering of the media contents. This is possible since the correct time alignment of the track fragments and media content portions in the subsequent media container file h+1 can be determined based on the durations or lengths of the track fragments and media content portions in the previous subsequent media container file h if these where correctly time aligned. The track fragment adjustment information therefore in particular becomes important to achieve synchronized rendering when tuning in or randomly accessing a stream of subsequent media container files and where no previous media container files have been received. Step S61 therefore involves co-rendering the media content portions defined by the media tracks in the second subsequent media container files during the media presentation and where the co-rendering is performed independently of any track fragment adjustment information contained in the second subsequent media container file. The method then ends or continues to step S60 for receiving a further subsequent media container file.

Figure 13:
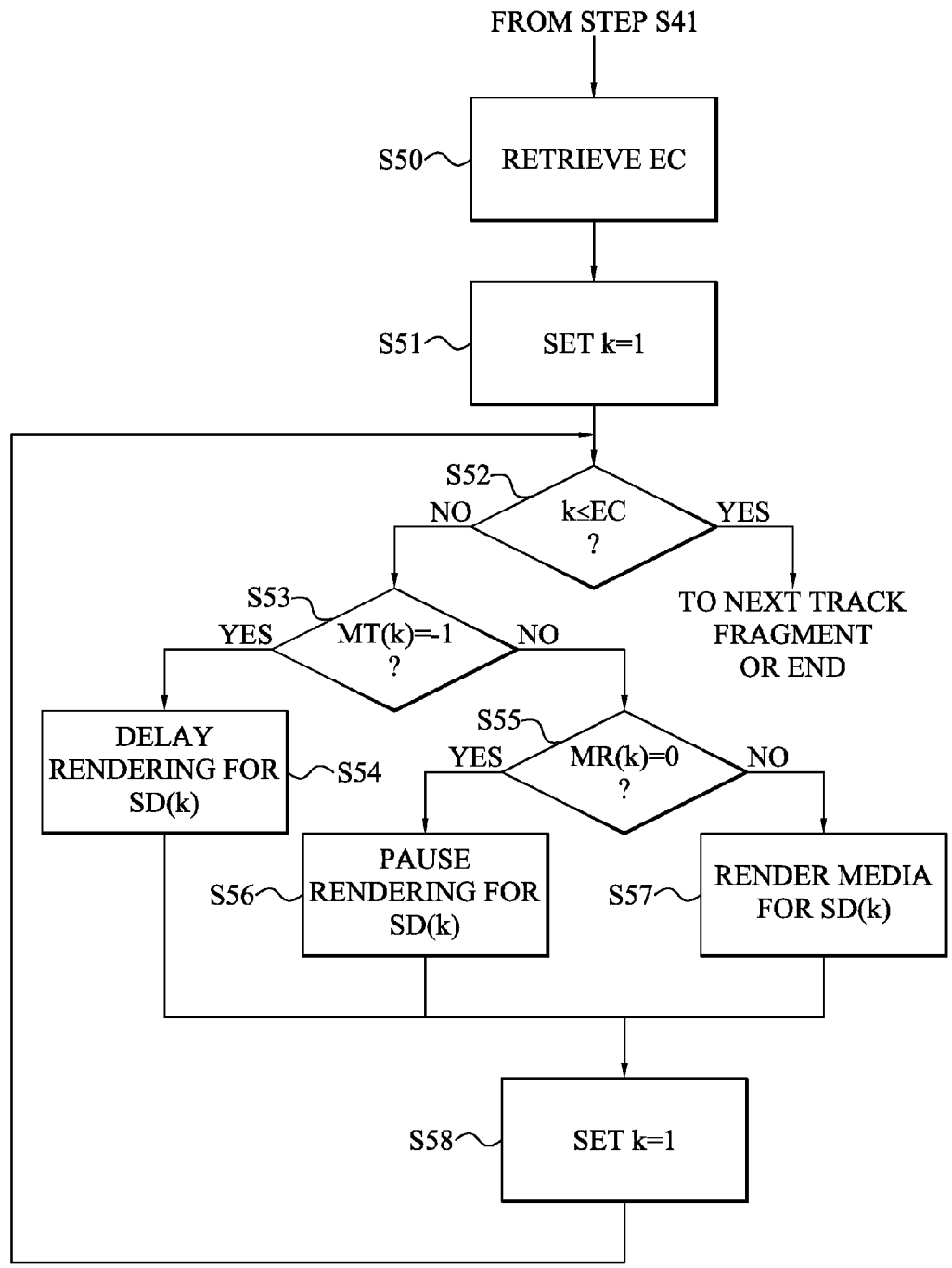
FIG. 13 is a flow diagram illustrating an embodiment of the co-rendering step in FIG. 12.

FIG. 13 is a flow diagram illustrating an embodiment of the co-rendering step of FIG. 12. The method continues from step S41 in FIG. 12. A next step S50 retrieves an indication of the number of adjustment segments for a track fragment and therefore for the portion of the media content to which the track fragment is associated. This indication, which is denoted as EC for entry count in FIG. 13, is retrieved in step S50 from the track fragment adjustment information in the track fragment. A next step S51 sets a counter k equal to one to indicate the first adjustment segment. A next step S52 verifies whether all adjustment segments have been processed and whether the counter k has reached the number retrieved in step S50, i.e. whether k=EC. If the last adjustment segment has been reached the method ends or continues to process a next track fragment. However, it might be preferred to process the multiple track fragments in a media container file in parallel. In such a case, the method steps of FIG. 13 are basically conducted in parallel for the track fragments in the subsequent media container file. If a serial processing is instead performed, the method continues from step S52 to step S50 but relating to the next track fragment in the subsequent media container file.

The next step S53 retrieves a time indication for the current adjustment segment number k and verifies whether the time indication has a predefined value representing a so-called empty edit. In the figure, this time indication is represented by MT(k) indicating media time for adjustment segment number k. The predefined value is preferably equal to −1. If MT(k)=−1 the method continues to step S54, the rendering of the media content associated with the track fragment adjustment information is delayed for a time period corresponding to the duration of the current adjustment segment number k. This duration is defined by a time duration retrieved from the track fragment adjustment information in step S54. The time duration has been represented by SD(k) in the figure, representing segment duration for adjustment segment number k.

If the time indication does not have the predefined value of −1 the method continues from step S53. In an optional embodiment, the track fragment adjustment information comprises a rate indication. The rate indication has been represented by MR(k) in the figure denoting media rate for adjustment segment number k. In such a case, the optional step S55 retrieves the rate indication for the current adjustment segment from the track fragment adjustment information and verifies whether it has a predefined value equal to 0, indicating a so-called "dwell". If MR(k)=0 the method continues from step S55 to the optional step S56, where rendering of the relevant media content is paused for the duration of the current adjustment segment as defined based on the time duration SD(k).

However, if the rate indication is not equal to the predefined value of 0 the method continues to step S57 where media content is rendered for a time period corresponding to the duration of the current adjustment segment SD(k).

The method then continues from step S54, S56 or S57 to step S58, where the counter k is increased by one to indicate that the next adjustment segment should be processed. The method continues to step S52.

The time indication MT(k) of the track fragment adjustment information is therefore employed to select whether to render the media content corresponding to the adjustment segment for the time duration as defined by SD(k) or delay rendering the media content for a time period corresponding to SD(k). In another embodiment, the time indication MT(k) can be used to select whether to rendering media content, delay rendering of media content or advance rendering of media content for a time period defined by SD(k).

Correspondingly, the rate indication MR(k) of the track fragment adjustment information can be used to select whether to render media content corresponding to the adjustment segment number k for a time period defined by SD(k) or pause rendering of the media content for a time period corresponding to SD(k).

Figure 15:
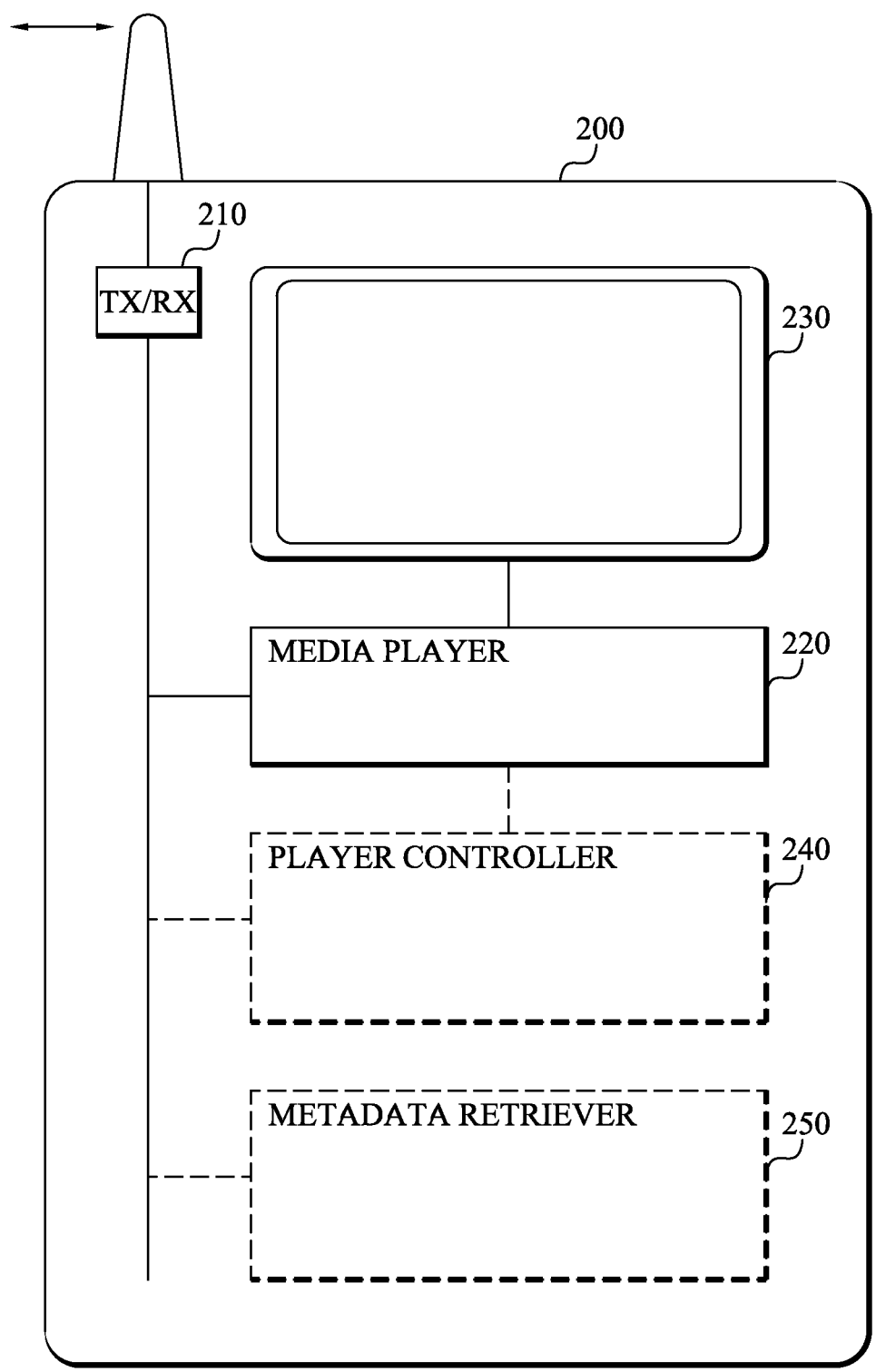
FIG. 15 is a schematic block diagram of a user terminal according to an embodiment.

FIG. 15 is a schematic block diagram of a user terminal 200 according to an embodiment. The user terminal 200 is exemplified by a mobile terminal in the figure. However, this should merely be seen as an illustrative example. User terminal could be any entity or device or aggregation of multiple devices that has decoding and rendering capability. A single such device could be a mobile terminal, such as mobile telephone or laptop, a computer, a set top box for a TV or any other media processing device. The decoding and rendering functionality can be present in different devices that are then capable of conducting wired or wireless communication with each other. User terminal therefore also encompasses such a distributed implementation embodiment of various media terminal embodiments.

The user terminal 200 comprises a transmitter 210 configured to transmit a request for a media container file. The request could a random access request, a tune in request or a seek request for accessing a media content stream that is optionally streamed using HTTP. The media container file is an initial media container file as previously discussed and comprises initial tracks for the media contents defined by the initial tracks and configured to be co-rendered by the user terminal 200 in a media presentation. The user terminal 200 also comprises a receiver 210 configured to receive the requested initial media container file and also receive a subsequent media container file. The receiver and transmitter can be implemented as separate devices or as a common transceiver 210. The subsequent media container file comprises a respective track fragment for each media content to define respective decoding and rendering instructions for the portions of the media contents associated with the subsequent media container file.

A media player 220 is implemented in the user terminal 200 for co-rendering the media content portions defined in the subsequent media container file received by the receiver 210. This co-rendering by the media player is performed based on the instructions defined in the track fragments and based on rendering timing relationships defined by track fragment adjustment information contained in one or more track fragments of the subsequent media container file. The co-rendered media data could then be presented on a display screen 230 of or connected to the user terminal 200 and played back on a loudspeaker (not illustrated) of or connected to the user terminal 200.

The user terminal 200 preferably also comprises a decoder (not illustrated) that can form part of the media player 220 and is configured to decode the media content preferably based on the track fragments in the subsequent media container file.

In an embodiment, the user terminal 200 comprises an optional metadata retriever 250. The metadata retriever 250 is configured to retrieve an indication of the number of adjustment segments in the portion of the relevant media content, the time duration for each adjustment segment and a respective time indication for each adjustment segment from the track fragment adjustment information. An optional player controller 240 is implemented to control the operation of the media player 220 based on the time indication of a current adjustment segment. The player controller 240 then controls the media player 220 to render media content corresponding to the adjustment segment for a time period defined by the time duration of the adjustment segment, control the media player to advance rendering for a time period defined by the time duration or delay rendering for a time period defined by the time duration depending on the value of the time indication.

In a further embodiment, the metadata retriever 250 additionally retrieves a rate indication for each adjustment segment from the track fragment adjustment information. In such a case, the player controller additionally controls the media player 220 based on the rate indication in addition to the time indication. The rate indication can then be used in order to control the media player 220 to render media content corresponding to the adjustment segment for a time period defined by the time duration of the adjustment segment or control the media player 220 to pause rendering for a time period defined by the time duration.

The track fragment adjustment information is advantageously only employed in connection with the reception of the first subsequent media container file. Thus, when the receiver 210 receives a second and further subsequent media container files of the stream these subsequent media container files have track fragments for the media contents and optionally also track fragment adjustment information. However, the media player 220 then performs the co-rendering of the portions of the media contents defined by the second and further subsequent media container files based on the track fragments in these subsequent media container file but independently of any track fragment adjustment information contained in the subsequent media container files.

The units 210 to 250 of the user terminal 200 may be implemented or provided as hardware or a combination of hardware and software. In the case of a software-based implementation, a computer program product implementing the user terminal 200 or a part thereof comprises software or a computer program run on a general purpose or specially adapted computer, processor or microprocessor. The software includes computer program code elements or software code portions illustrated in FIG. 15. The program may be stored in whole or part, on or in one or more suitable non-transitory computer readable media or data storage means such as magnetic disks, CD-ROMs, DVD disks, USB memories, hard discs, magneto-optical memory, in RAM or volatile memory, in ROM or flash memory, as firmware, or on a data server.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of providing media content for streaming, said method comprising:
    providing, in a media container file formatted according to the ISO base media file format and for each media content of at least a first media content and a second media content, an initial track comprising an identifier of said media content and information of a codec employed for encoding said media content;
    providing, for each media content of said at least first media content and second media content, at least one track fragment comprising information defining decoding and rendering instructions for a media content portion of said media content;
    determining, for each adjustment segment of a number of adjustment segments defined in a media content portion of said first media content defined by said track fragment, a time duration of said adjustment segment;
    determining, for each adjustment segment of said number of adjustment segments, a time indication representing a starting time of said adjustment segment within said media content portion of said first media content or representing an empty time indicating that no rendering of said first media content should occur during the duration of said adjustment segment; and
    providing, in a track fragment associated with said first media content, track fragment adjustment information applicable to said media content portion of said first media content and comprising said number of adjustment segments, and said time duration and said time indication for each adjustment segment, wherein said track fragment adjustment information defines rendering timing relationships between said media content portion of said first media content and the corresponding media content portion of said second media content to be co-rendered with said media content portion of said first media content during a media presentation.

2. The method of claim 1, wherein providing said track fragment adjustment information further comprises determining, for each adjustment segment of said number of adjustment segments, a rate indication representing a relative rendering rate for media content corresponding to said adjustment segment and has a predefined value if said media content corresponding to said adjustment segment is to be presented for the duration of said adjustment segment and otherwise has another predefined value, wherein defining said track fragment adjustment information comprises defining said track fragment adjustment information to comprise said number of adjustment segments and said time duration, said time indication and said rate indication for each adjustment segment.

3. The method of claim 1, further comprising:
    retrieving a time stamp of a first media sample in said media content portion of said first media content and a time stamp of a first media sample in said corresponding media content portion of said second media content;
    calculating a time offset based on said time stamp of said first media sample in said media content portion of said first media content and said time stamp of said first media sample in said corresponding media content portion of said second media content; and
    determining said time indication of said track fragment adjustment information based on said time offset.

4. A device for providing media content for streaming, said device comprising:
- a track provider configured to provide, in a media container file formatted according to the ISO base media file format and for each media content of at least a first media content and a second media content, an initial track comprising an identifier of said media content and information of a codec employed for encoding said media content;
- a fragment provider configured to provide, for each media content of said at least first media content and second media content, at least one track fragment comprising information defining decoding and rendering instructions for a media content portion of said media content; and
- an information provider configured to provide, in a track fragment associated with said first media content, track fragment adjustment Information applicable to a media content portion of said first media content defined by said track fragment, said fragment provider comprises:
  - a number definer configured to define a number of adjustment segments in said media content portion of said first media content;
  - a duration determiner configured to determine, for each adjustment segment of said number of adjustment segments, a time duration of said adjustment segment;
  - a time indication determiner configured to determine, for each adjustment segment of said number of adjustment segments, a time indication representing a starting time of said adjustment segment within said media content portion of said first media content or representing an empty time indicating that no rendering of said first media content should occur during the duration of said adjustment segment; and
  - an information definer configured to define said track fragment adjustment information to comprise said number of adjustment segments, and said time duration and said time indication for each adjustment segment, wherein said track fragment adjustment information defines rendering timing relationships between said media content portion of said first media content and the corresponding media content portion of said second media content to be co-rendered with said media content portion of said first media content during a media presentation.

5. The device of claim 4, wherein said fragment provider is configured to provide, for each media content of said at least first media content and second media content, said at least one track fragment contained in a subsequent media container file formatted according to the ISO base media file format.

6. The device of claim 5, further comprising a transmitter configured to transmit said media container tile to a requesting user terminal and stream said subsequent media container file to said user terminal using the Hypertext Transport Protocol, HTTP.

7. The device of claim 6, wherein said information provider is configured to provide, in said track fragment associated with said first media content, said track fragment adjustment Information applicable to said media content portion of said first media content, and provide, in a track fragment associated with said second media content, track fragment adjustment information applicable to said corresponding media content portion of said second media content, wherein said track fragment adjustment Information defines rendering timing relationships between said media content portion of said first media content and said corresponding media content portion of said second media content.

8. The device of claim 4, wherein said information provider comprises a rate indication determiner configured to determine, for each adjustment segment of said number of adjustment segments, a rate indication representing a relative rendering rate for media content corresponding to said adjustment segment and has a predefined value if said media content corresponding to said adjustment segment is to be presented for the duration of said adjustment segment and otherwise has another predefined value, wherein said information definer is configured to define said track fragment adjustment information to comprise said number of adjustment segments and said time duration, said time indication and said rate indication for each adjustment segment.

9. The device of claim 4, further comprising:
- a time stamp retriever configured to retrieve a time stamp of a first media sample in said media content portion of said first media content and a time stamp of a first media sample in said corresponding media content portion of said second media content;
- an offset calculator configured to calculate a time offset based on said time stamp of said first media sample in said media content portion of said first media content and said time stamp of said first media sample in said corresponding media content portion of said second media content; and
- an information determiner configured to determine said time indication of said track fragment adjustment Information based on said time offset.

10. The device of claim 9, further comprising a time stamp translator configured to translate said time stamp of said first media sample in said media content portion of said first media content having a first sampling rata and said time stamp of said first media sample in said corresponding media content portion of said second media content having a second, different sampling rate to a common time scale to form a first translated time stamp and a second translated time stamp, wherein said offset calculator is configured to calculate said time offset as a difference between said first translated time stamp and said second translated time stamp.

11. The device of claim 10, further comprising a value finder configured to find a minimum value or a maximum value of said first translated time stamp and said second translated time stamp, wherein
- said offset calculator is configured to calculate a first time offset between said minimum value or said maximum value and said first translated time stamp and calculate a second time offset between said minimum value or said maximum value and said second translated time stamp; and
- said information determiner is configured to determine said track fragment adjustment information based on said first time offset and said second time offset.

12. The device of claim 4, wherein said information provider is configured to provide, in said at least one track fragment, said track fragment adjustment information in response to reception of a random access request by a receiver of said device.

13. A method of rendering media content comprising:
- requesting and receiving a media container file formatted according to the ISO base media file format and comprising, for each media content of at least a first media content and a second media content, an initial track comprising an identifier of said media content and information of a codec employed for encoding said media content;
- receiving a subsequent media container file formatted according to the ISO base media file format and comprising, for each media content of said at least first media content and said second media content, a track fragment comprising information defining decoding and rendering instructions of a media content portion of said media content and track fragment adjustment information contained in a track fragment associated with said first media content and applicable to a media content portion of said first media content;

retrieving, from said track fragment adjustment information, an indication of the number of adjustment segments in said media content portion of said first media content, a time duration for each adjustment segment of said number of adjustment segments and a time indication, for each adjustment segment of said number of adjustment segments, representing a starting time for said adjustment segment within said media content portion of said first media content or representing an empty time indicating that no rendering of said first media content should occur during the duration of said adjustment segment; and co-rendering said media content portion of said first media content and a corresponding media content portion of said second media content during a media presentation based on said track fragments and based on said track fragment adjustment Information defining rendering timing relationships between said media content portion of said first media content and said corresponding media content portion of said second media content by selecting, for each adjustment segment of said number of adjustment segments and based on said time indication of said adjustment segment, whether to render media content corresponding to said adjustment segment of said first media content in said media content portion for a time period defined by the time duration of said adjustment segment, advance rendering for a time period defined by said time duration of said adjustment segment or delay rendering for a time period defined by said time duration of said adjustment segment.

14. The method of claim 13, wherein retrieving from said track fragment adjustment information comprises retrieving, from said track fragment adjustment information, said indication of the number of adjustment segments in said media content portion of said first media content, said time duration for each adjustment segment of said number of adjustment segments, said time indication for each adjustment segment of said number of adjustment segments and a rate indication for each adjustment segment of said number of adjustment segments, wherein co-rendering said media content portion and said corresponding media content portion comprises selecting, for each adjustment segment of said number of adjustment segments and based on said rate indication of said adjustment segment, whether to render media content corresponding to said adjustment segment in said media content portion of said first media content for a time period defined by said time duration of said adjustment segment or pause rendering for a time period defined by said time duration of said adjustment segment.

15. The method of claim 13, further comprising:
receiving a second subsequent media container file formatted according to the ISO base media file format and comprising, for each media content of said at least first media content and said second media content, a track fragment comprising information defining decoding and rendering instructions of a second media content portion of said media content and track fragment adjustment information contained in a track fragment associated with said first media content and applicable to a second media content portion of said first media content; and co-rendering said second media content portion of said first media content and a corresponding second media content portion of said second media content during said media presentation based on said track fragments contained in said second subsequent media container file but independently of said track fragment adjustment information contained in said second subsequent media container file.

16. A user terminal comprising:
a transmitter configured to transmit a request for a media container file formatted according to the ISO base media file format and comprising, for each media content of at least a first media content and a second media content, an initial track comprising an identifier of said media content and information of a codec employed for encoding said media content;

a receiver configured to receive said media container file and a subsequent media container file formatted according to the ISO base media file format and comprising, for each media content of said at least first media content and said second media content, a track fragment comprising information defining decoding and rendering instructions of a media content portion of said media content and track fragment adjustment information contained in a track fragment associated with said first media content and applicable to a media content portion of said first media content;

a metadata retriever configured to retrieve, from said track fragment adjustment information, an indication of the number of adjustment segments in said media content portion of said first media content, a time duration for each adjustment segment of said number of adjustment segments and a time indication, for each adjustment segment of said number of adjustment segments, representing a starting time for said adjustment segment within said media content portion of said first media content or representing an empty time indicating that no rendering of said first media content should occur during the duration of said adjustment segment;

a media player configured to co-render said media content portion of said first media content and a corresponding media content portion of said second media content during a media presentation based on said track fragment adjustment information defining rendering timing relationships between said media content portion of said first media content and said corresponding media content portion of said second media content; and a player controller configured to, for each adjustment segment of said number of adjustment segments and based on said time indication of said adjustment segment, control said media player to render media content corresponding to said adjustment segment of said first media content in said media content portion for a time period defined by the time duration of said adjustment segment, control said media player to advance rendering for a time period defined by said time duration of said adjustment segment or control said media player to delay rendering for a time period defined by said time duration of said adjustment segment.

17. The user terminal of claim 16, wherein
said metadata retriever is configured to retrieve, from said track fragment adjustment information, said indication of the number of adjustment segments in said media content portion of said first media content, said time duration for each adjustment segment of said number of adjustment segments, said time indication for each adjustment segment of said number of adjustment segments and a rate indication for each adjustment segment of said number of adjustment segments, and said player controller is configured to, for each adjustment segment of said number of adjustment segments and based on said rate indication of said adjustment segment, control said media player to render media content corresponding to said adjustment segment in said media content portion of said first media content for a time period defined by said time duration of said adjustment segment or control said media player to pause rendering for a time period defined by said time duration of said adjustment segment.

18. The user terminal of claim 16, wherein said receiver is configured to receive a second subsequent media container file formatted according to the ISO base media file format and comprising, for each media content of said at least first media content and said second media content, a track fragment comprising information defining decoding and rendering instructions of a second media content portion of said media content and track fragment adjustment information contained in a track fragment associated with said first media content and applicable to a second media content portion of said first media content, and said media player is configured to co-render said second media content portion of said first media content and a corresponding second media content portion of said second media content during said media presentation based on said track fragments contained In said second subsequent media container file but independently of said track fragment adjustment information contained in said second subsequent media container file.

19. The device of claim 16, wherein said transmitter is configured to request said media container file by transmitting a random access request for media content streamed over the Hypertext Transfer Protocol.

* * * * *

UNITED STATES PATENT AND TRADEMARK OFFICE
CERTIFICATE OF CORRECTION

PATENT NO. : 8,635,359 B2  
APPLICATION NO. : 13/508059  
DATED : January 21, 2014  
INVENTOR(S) : Frojdh et al.

Page 1 of 1

It is certified that error appears in the above-identified patent and that said Letters Patent is hereby corrected as shown below:

In the Claims

Column 21, Line 52, Claim 6, delete "container tile" and insert -- container file --, therefor.

Column 22, Line 32, Claim 10, delete "sampling rata" and insert -- sampling rate --, therefor.

Column 26, Line 11, Claim 18, delete "In said" and insert -- in said --, therefor.

Column 26, Line 16, Claim 19, delete "device" and insert -- user terminal --, therefor.

Signed and Sealed this  
Sixth Day of January, 2015

Michelle K. Lee  
*Deputy Director of the United States Patent and Trademark Office*